(12) United States Patent
Drew et al.

(10) Patent No.: US 12,049,911 B2
(45) Date of Patent: Jul. 30, 2024

(54) ANCHOR ASSEMBLY

(71) Applicant: Delta Cycle Corporation, Randolph, MA (US)

(72) Inventors: Errol Drew, Los Gatos, CA (US); Glenn Lars Hansen, San Jose, CA (US)

(73) Assignee: Delta Cycle Corporation, Randolph, MA (US)

( * ) Notice: Subject to any disclaimer, the term of this patent is extended or adjusted under 35 U.S.C. 154(b) by 149 days.

(21) Appl. No.: 17/883,777

(22) Filed: Aug. 9, 2022

(65) Prior Publication Data

US 2023/0056005 A1    Feb. 23, 2023

Related U.S. Application Data

(60) Provisional application No. 63/234,425, filed on Aug. 18, 2021.

(51) Int. Cl.
  *F16B 21/00*    (2006.01)
  *F16B 13/08*    (2006.01)
(52) U.S. Cl.
  CPC .............................. *F16B 13/0808* (2013.01)
(58) Field of Classification Search
  CPC .................................................. F16B 13/0808
  See application file for complete search history.

(56) References Cited

U.S. PATENT DOCUMENTS

| | | | | |
|---|---|---|---|---|
| 2,950,141 | A * | 8/1960 | Koff ..................... | F16B 13/0808 292/256.73 |
| 3,127,807 | A * | 4/1964 | Modrey .............. | F16B 13/0808 411/965 |
| 3,248,994 | A * | 5/1966 | Mortensen .......... | F16B 13/0808 411/344 |
| 3,927,597 | A * | 12/1975 | Stults .................. | F16B 13/0808 411/341 |
| 5,067,864 | A * | 11/1991 | Dewey ................ | F16B 13/0808 411/340 |
| 5,876,169 | A * | 3/1999 | Wrigley ................ | F16B 13/002 411/29 |
| 6,435,789 | B2 * | 8/2002 | Gaudron ............... | F16B 13/002 411/29 |
| 7,736,108 | B1 * | 6/2010 | Bruce ................. | F16B 13/0808 411/340 |
| 7,828,501 | B2 * | 11/2010 | Bauer .................. | F16B 13/0808 411/908 |
| 7,955,392 | B2 * | 6/2011 | Dewey ............... | A61B 17/7068 606/248 |

(Continued)

*Primary Examiner* — Gary W Estremsky
(74) *Attorney, Agent, or Firm* — Iandiorio Teska & Coleman, LLP (57) ABSTRACT

An anchor assembly includes an anchor body for insertion into a wall. A toggle member has an aperture therethrough and is slidable and pivotable relative to the anchor body. The toggle member is configured to have a first position slid forward aligned longitudinally with the anchor body, a second position slid forward and pivoted relative to the anchor body when the fastener engages the toggle member pivoting it relative to the anchor body, and a third position slid rearward and pivoted relative to the anchor body when the fastener enters the toggle member aperture and drives the toggle member rearward to engage the toggle member with the anchor body.

18 Claims, 10 Drawing Sheets

(56) References Cited

U.S. PATENT DOCUMENTS

| | | | |
|---|---|---|---|
| 8,449,236 B2* | 5/2013 | McDuff | F16B 13/0808 |
| | | | 411/340 |
| 2005/0214095 A1* | 9/2005 | Brown | F16B 13/0833 |
| | | | 411/80.1 |
| 2023/0047591 A1* | 2/2023 | Zhou | F16B 13/001 |

* cited by examiner

ANCHOR ASSEMBLY

RELATED APPLICATIONS

This application claims benefit of and priority to U.S. Provisional Application Ser. No. 63/234,425 filed Aug. 18, 2021, under 35 U.S.C. §§ 119, 120, 363, 365, and 37 C.F.R. § 1.55 and § 1.78, which is incorporated herein by this reference.

FIELD OF THE INVENTION

The disclosure herein relates to fastener/wall anchor assemblies also called toggle bolts.

BACKGROUND OF THE INVENTION

Various fastener/wall anchor assemblies are known including some form of a device which fits through a hole in the wall (e.g., sheet rock) and then expands or pivots once behind the wall to abut the inside of the wall and prevent the anchor from being removed. A fastener is then inserted into the anchor assembly to, for example, hang or hold items on the wall. See, for example, U.S. Pat. Nos. 4,828,439; 5,067,864; 6,435,789; and 9,587,661 all incorporated herein by this reference.

BRIEF SUMMARY OF THE INVENTION

Featured is a new anchor assembly configured such that the fastener inserted into the anchor body functions to pivot the toggle member (via features associated with the toggle member) and then drives the toggle member towards and to abut the inside of the wall and with a collar tab which urges the fastener into the toggle member aperture and including features which allow the anchor body to be used with different thickness walls.

Featured is an anchor assembly comprising an anchor body for insertion into a wall. A toggle member has an aperture therethrough and is slidable and pivotable relative to the anchor body. The toggle member is preferably configured to have a first position slid forward aligned longitudinally with the anchor body, a second position slid forward and pivoted relative to the anchor body when the fastener engages the toggle member pivoting it relative to the anchor body, and a third position slid rearward and pivoted relative to the anchor body when the fastener enters the toggle member aperture and drives the toggle member rearward to engage the toggle member with the anchor body.

The toggle member preferably includes a longitudinal channel and the anchor body may include a tab extending into the toggle member longitudinal channel when the toggle member is in the third position and engaged with the anchor body. In one example, the toggle member is C-shaped and the anchor body includes a channel portion receiving the C-shaped toggle member therein. The anchor body channel portion may include a pair of spaced sidewalls each with a passage therethrough. The toggle member may include a pair of spaced sidewalls each with a protrusion extending into an anchor body sidewall passage. In one example, the anchor body channel portion includes a top opening and a bottom opening each receiving an extent of the toggle member in its pivoted position. The toggle member longitudinal channel includes, in one example, an interior downward sloping ramp behind the aperture engaged by the fastener to pivot the toggle member.

Also featured is an anchor assembly comprising an anchor body including a collar with an aperture therethrough and spaced sidewalls extending rearwardly from the collar and defining a channel therebetween open at the top and bottom of the anchor body and a rearwardly extending collar tab between the sidewalls. A toggle member has an aperture therethrough and is configured to have a first position aligned longitudinally with the anchor body and slidably disposed in said channel to a distal position between the sidewalls, a second position pivoted relative to the anchor body sidewalls and extending through the anchor body channel top and bottom openings when a fastener is driven through the collar aperture and the toggle member aperture, and a third position pivoted relative to the anchor body sidewalls and extending through the anchor body channel top and bottom openings and slid to a proximal position between the anchor body sidewalls engaging the collar tab when the fastener is further driven through the collar aperture and toggle member aperture.

The toggle member may be C-shaped and include a bottom wall with the toggle aperture therethrough and a pair of spaced sidewalls extending upwardly from the bottom wall. Each toggle member sidewall may include an interior upwardly sloping ramp behind the toggle member aperture engaged by the fastener to pivot the toggle member from the first position to the second position whereupon the fastener enters the toggle member aperture. There can be a first slot between the collar tab and one anchor body sidewall and a second slot between the collar tab and the other anchor body sidewall. Preferably, in the third position, the toggle member sidewalls reside partially in said first and second slots, respectively.

The anchor body sidewalls may each include a longitudinal passage and the toggle member sidewalls then each include a protrusion extending outwardly therefrom into a said anchor body sidewall longitudinal passage.

In one example, the toggle member has a longer extent forward of the toggle member and aperture extending through the anchor body the channel top opening and a shorter extent rearward of the toggle member aperture extending through the anchor body channel bottom opening when the toggle member is in the second and third positions.

The anchor body collar preferably includes a forward plate and a plurality of fins extending rearwardly therefrom. In one example, the fastener includes a threaded portion received through the collar aperture and toggle member aperture and a post extending from the threaded portion for bracketless shelving.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
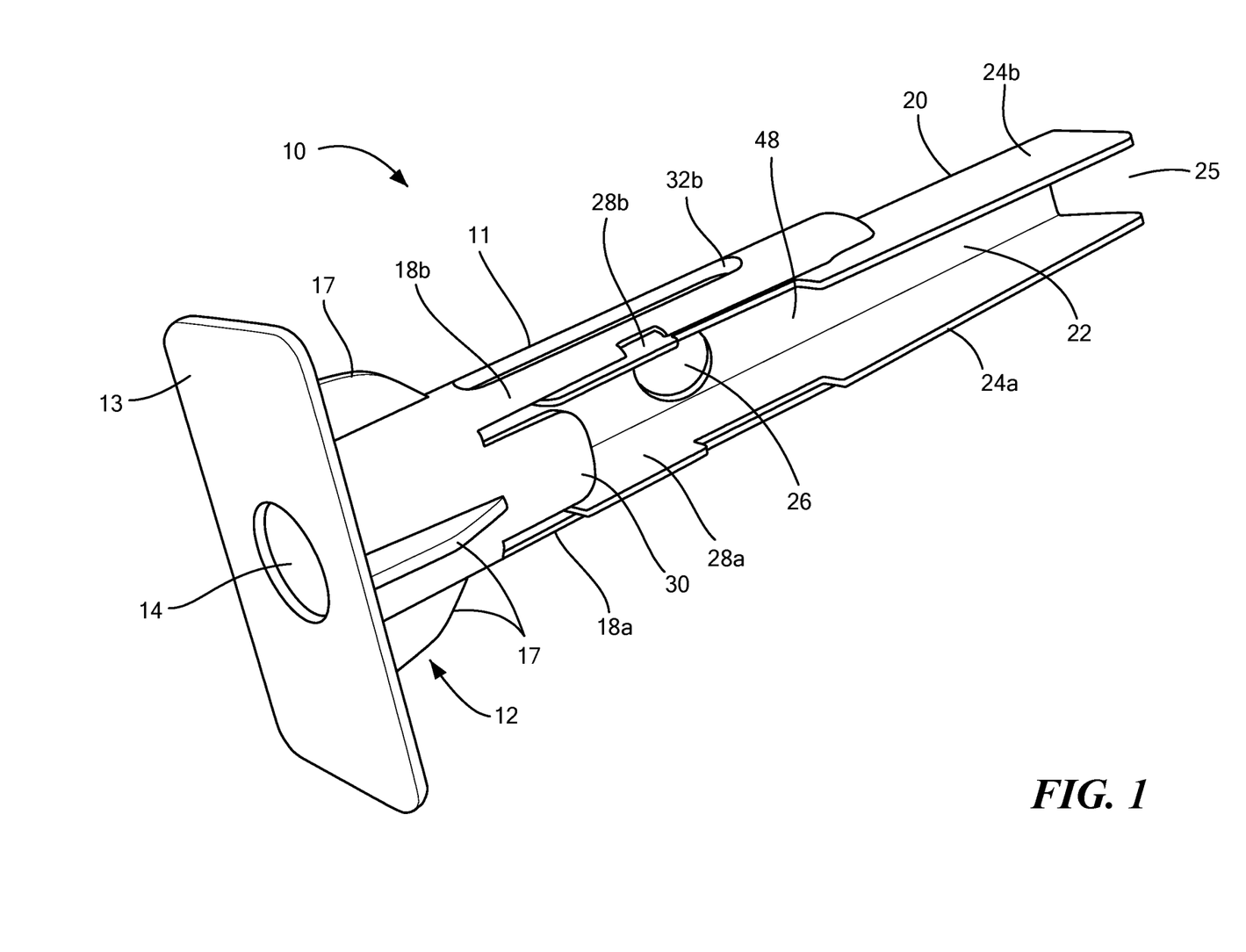
FIG. 1 is a schematic three-dimensional top view of an example of an anchor assembly in accordance with the invention.
Figure 2:
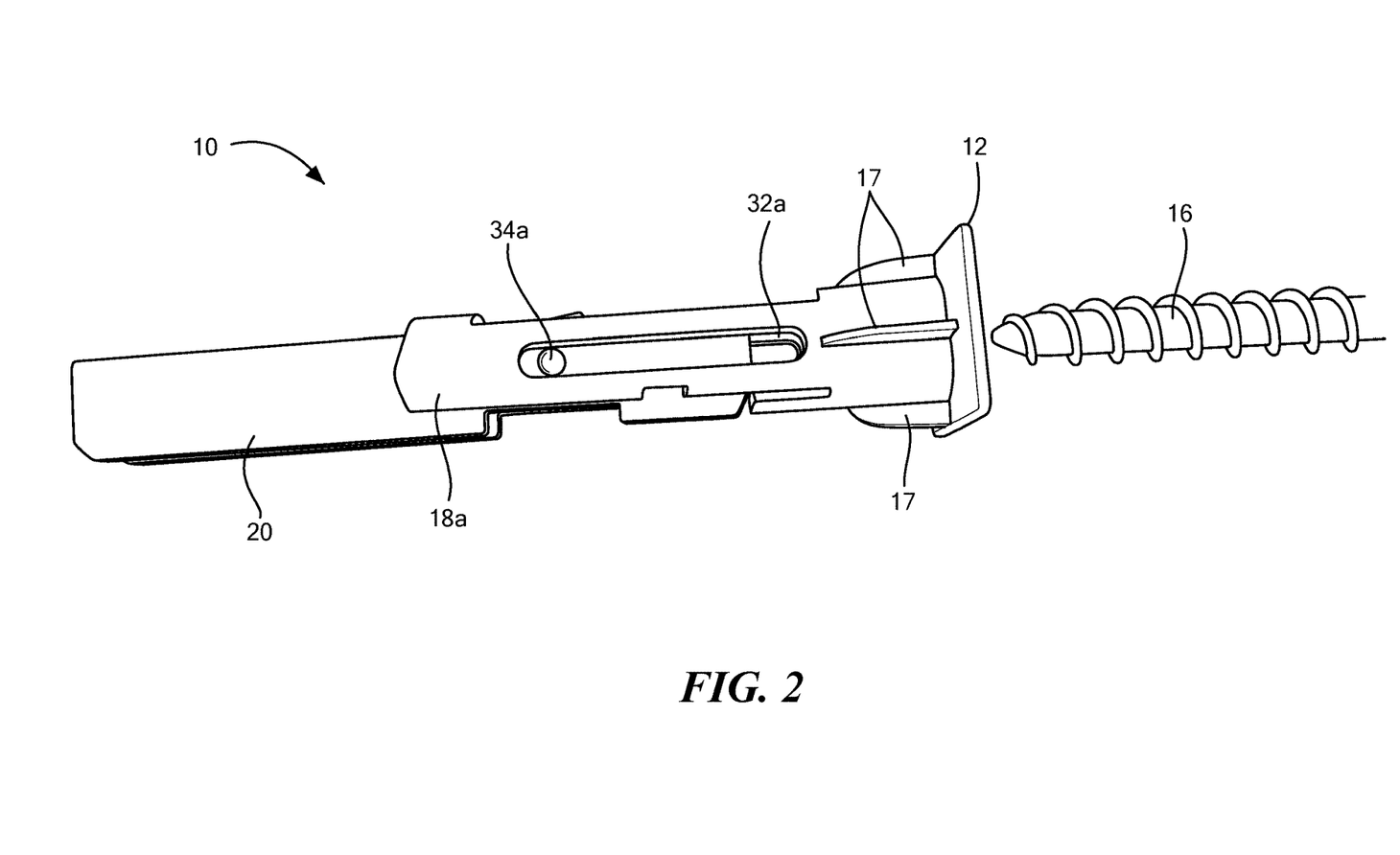
FIG. 2 is a schematic side view of the anchor assembly of FIG. 1.
Figure 3:
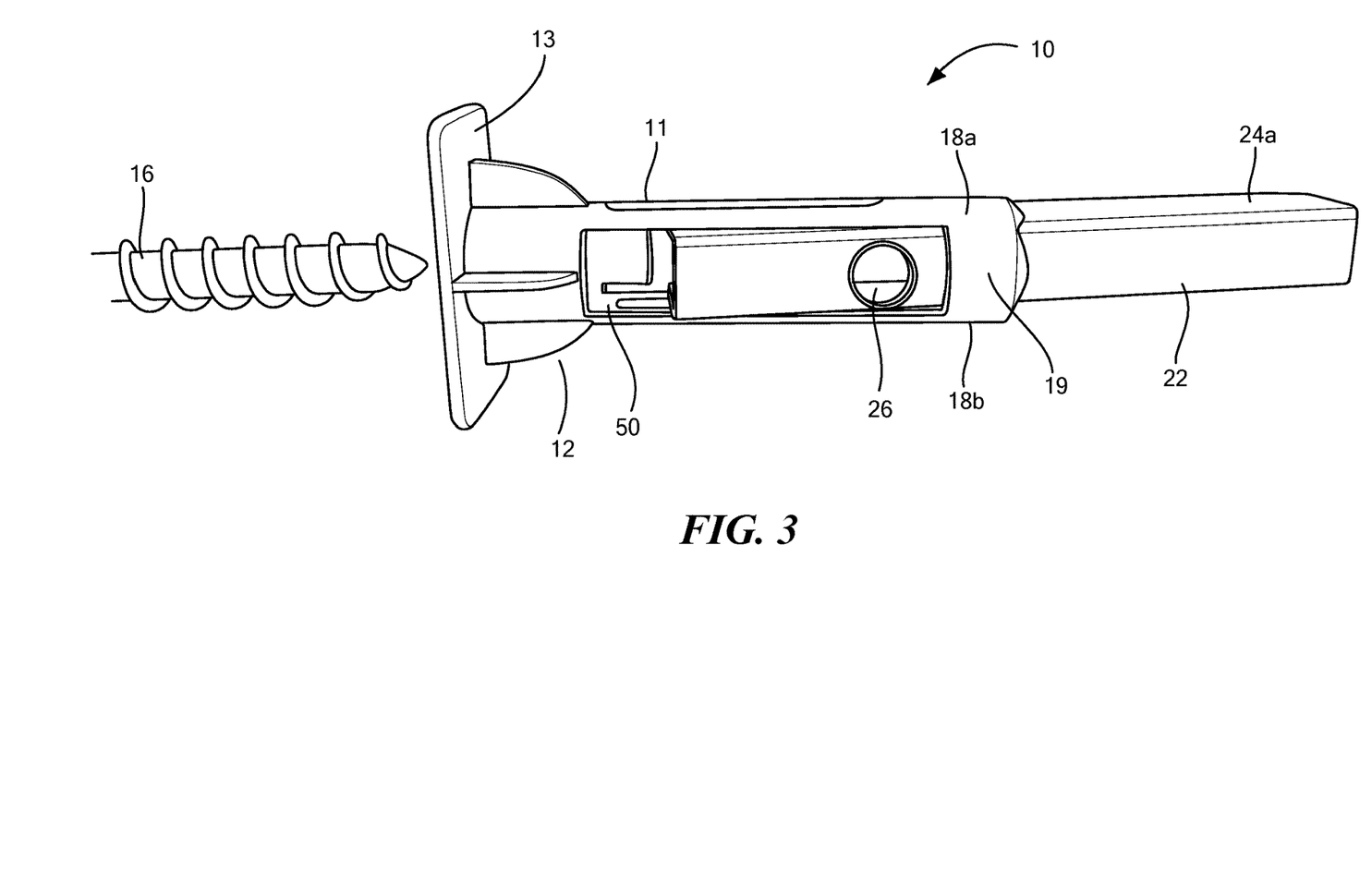
FIG. 3 is a bottom view of the anchor assembly of FIGS. 1-2.

FIGS. 1-3 depict an example of an anchor assembly 10 with anchor body 11 including collar 12 with forward plate 13 and aperture 14 therethrough for receiving fastener 16 (FIGS. 2-3). Fins 17 may extend rearwardly from the back of plate 13 in order to sink into and grip the outside of the wall. Spaced sidewalls 18a, 18b of the anchor body extend rearward from the collar 12 and define a channel therebetween open at the top and bottom receiving the toggle member 20 therein. Distal bridge 19 joins sidewalls 18a, 18b. Toggle member 20 is preferably C-shaped in cross section and includes bottom wall 22 and spaced sidewalls 24a, 24b extending upwardly therefrom. This structure defines a channel 25 receiving the fastener therein.

Accordingly, in the preferred embodiment, the anchor body includes a channel receiving the toggle member therein and the toggle member itself defines a channel receiving the fastener therein. Aperture 26 in bottom wall 22 of toggle member 20 also receives fastener 16. The toggle member sidewalls each include an interior upwardly sloping ramp 28a, 28b behind aperture 26 which is engaged by the fastener to pivot the toggle member relative to anchor body 11 to a position where the fastener can enter toggle aperture 26. Top rearwardly extending collar tab 30 also functions to urge the fastener slightly downward to enter toggle member 20 aperture 26.

Preferably, each anchor sidewall 18a, 18b includes a longitudinal passage 32a, 32b and the toggle sidewalls 24a, 24b include a corresponding outwardly extending protrusion 34a, 34b received into a respective anchor body sidewall longitudinal passage so the toggle member both slides relative to the anchor body and pivots relative to the anchor body.

Figure 4A:
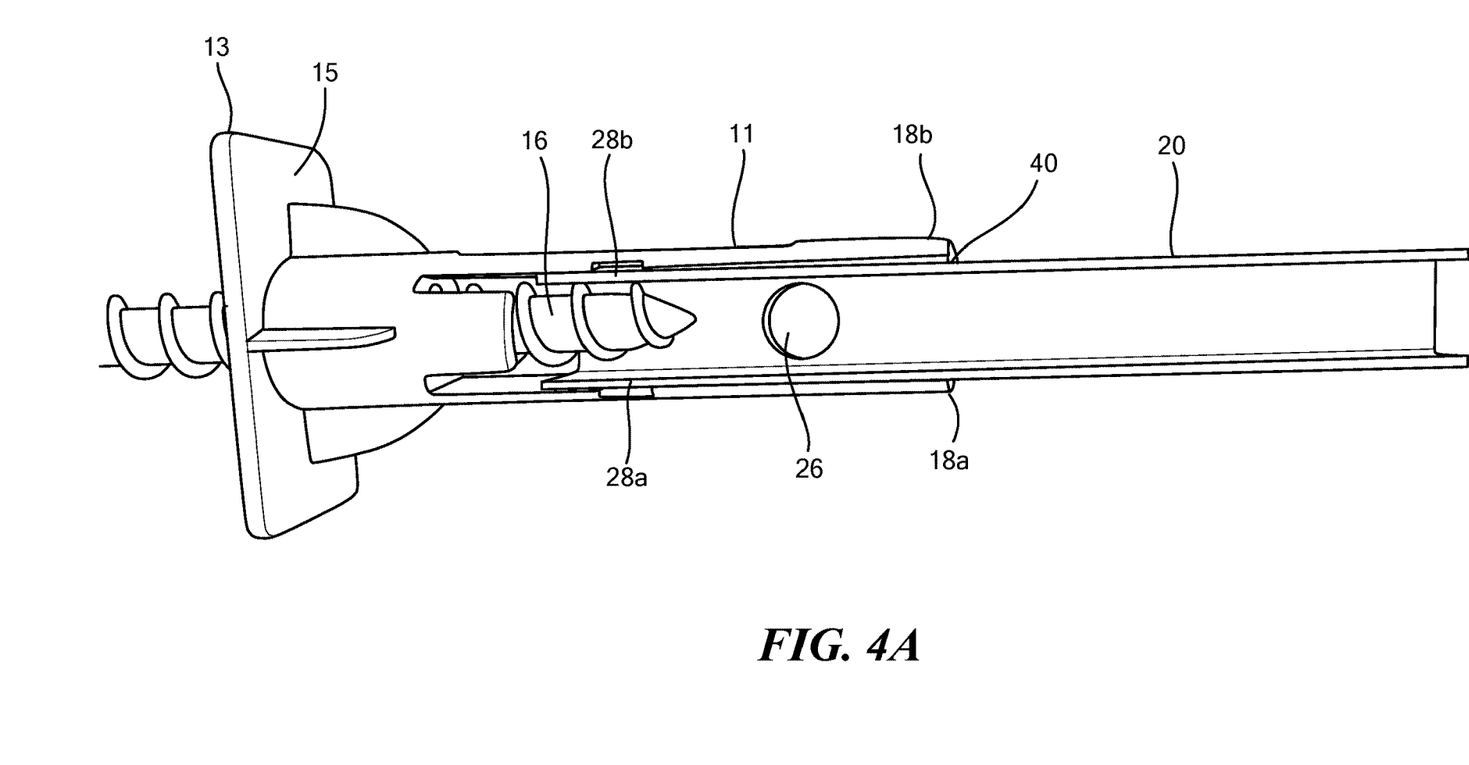
FIGS. 4A-4F are schematic views showing how the fastener threaded portion inserted into the anchor assembly pivots the toggle member relative to the anchor body and then slides the toggle member rearward to abut the interior of the wall.
Figure 4B:
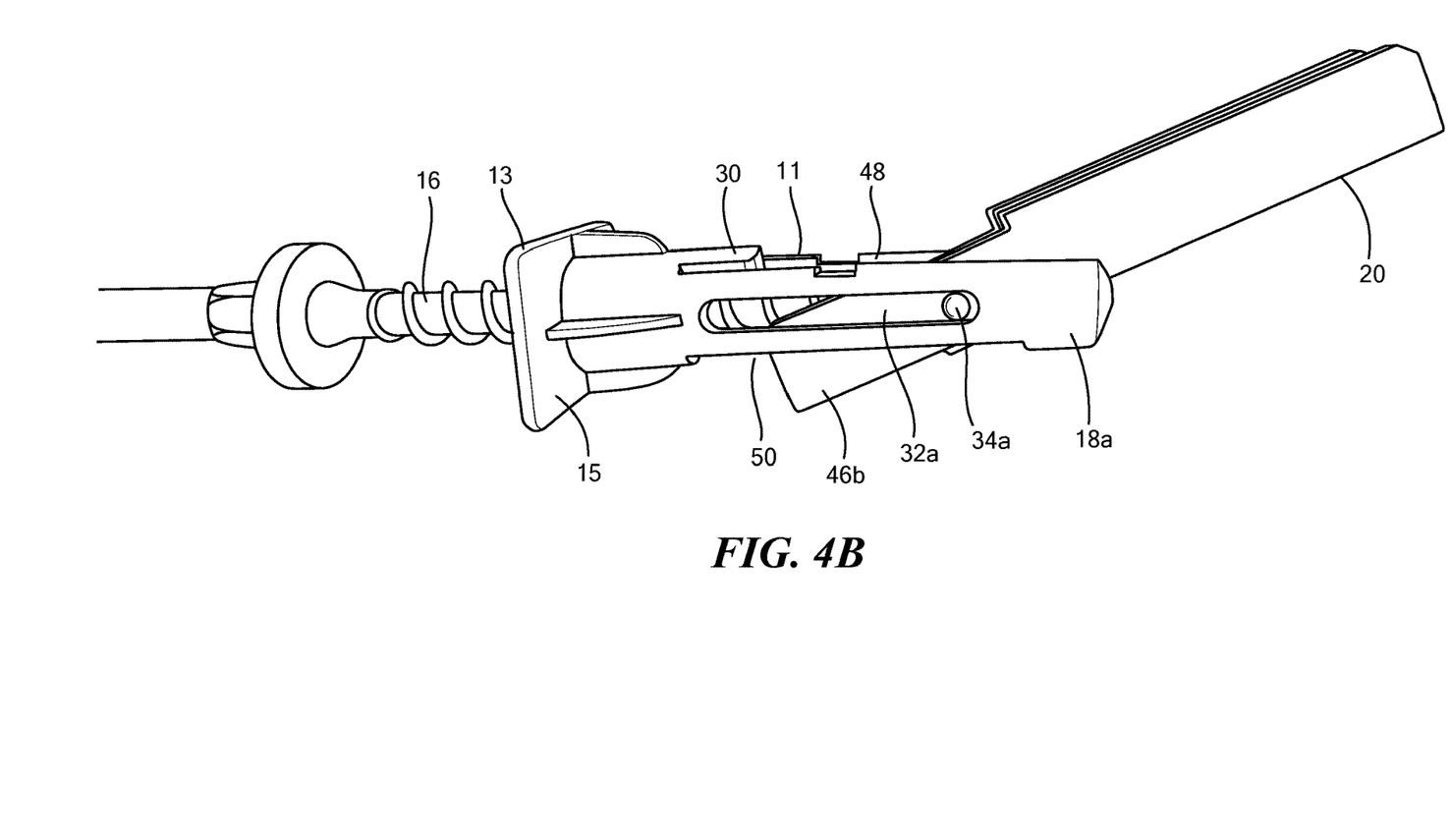
Figure 4C:
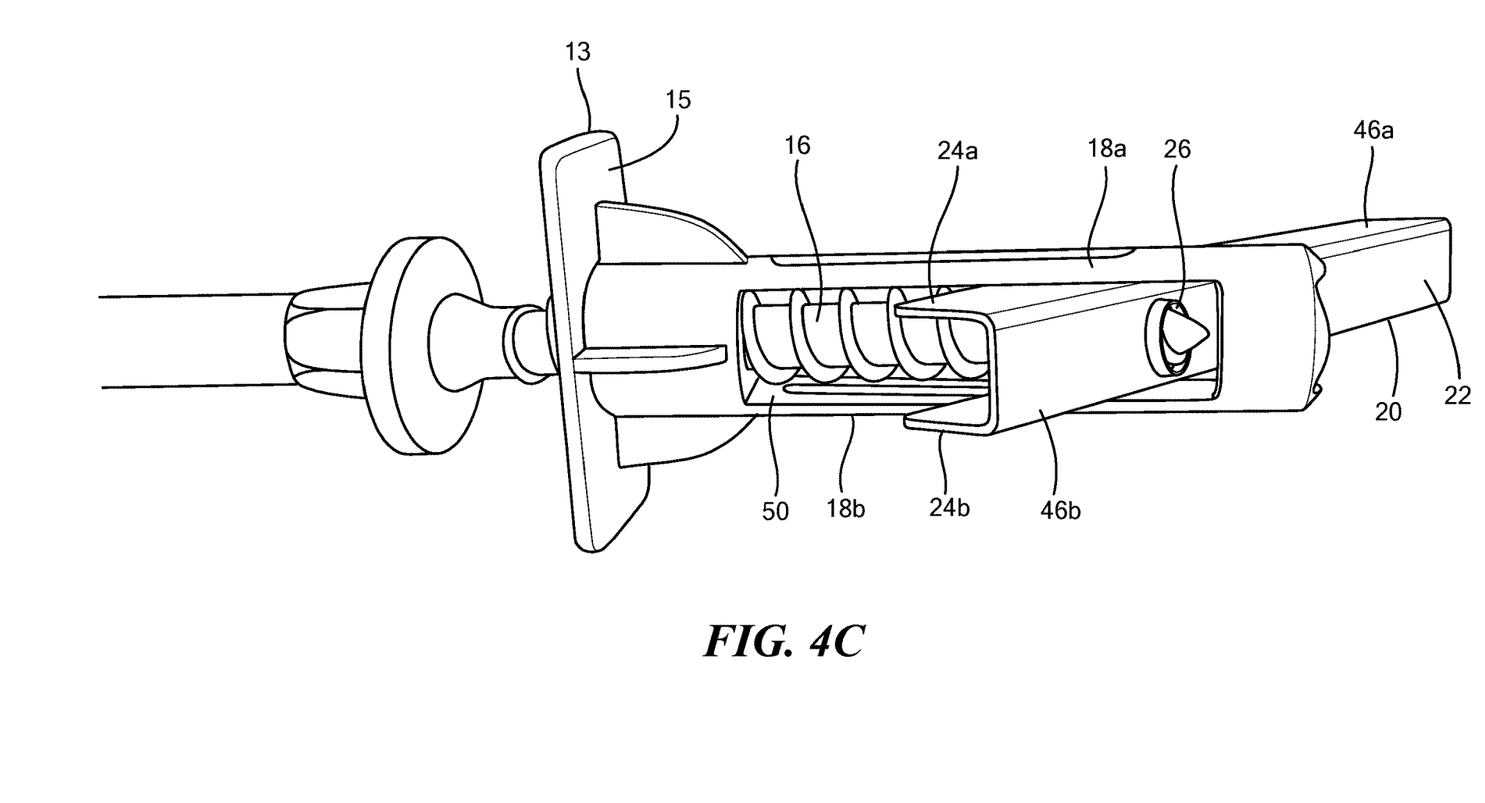
Figure 4D:
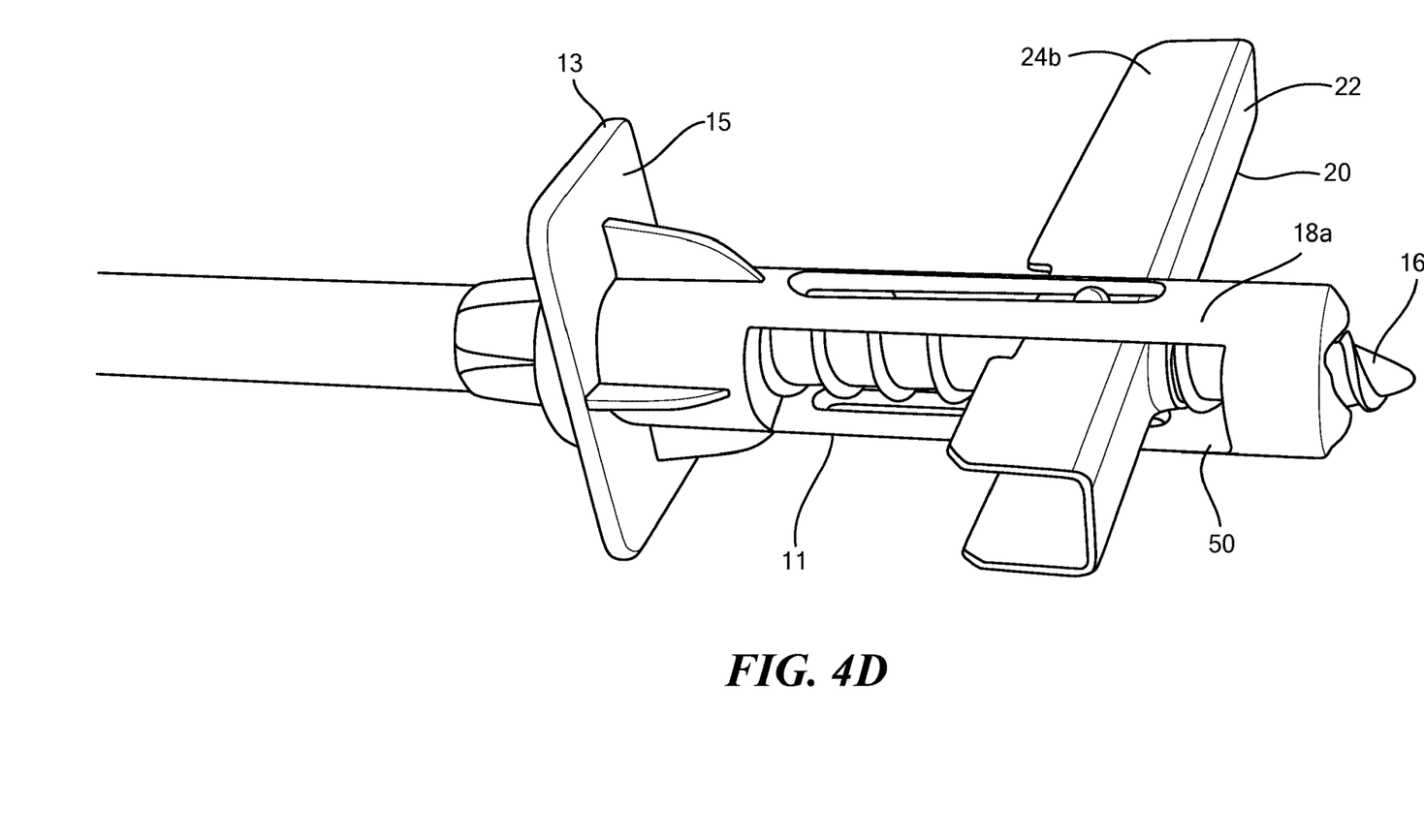
Figure 4E:
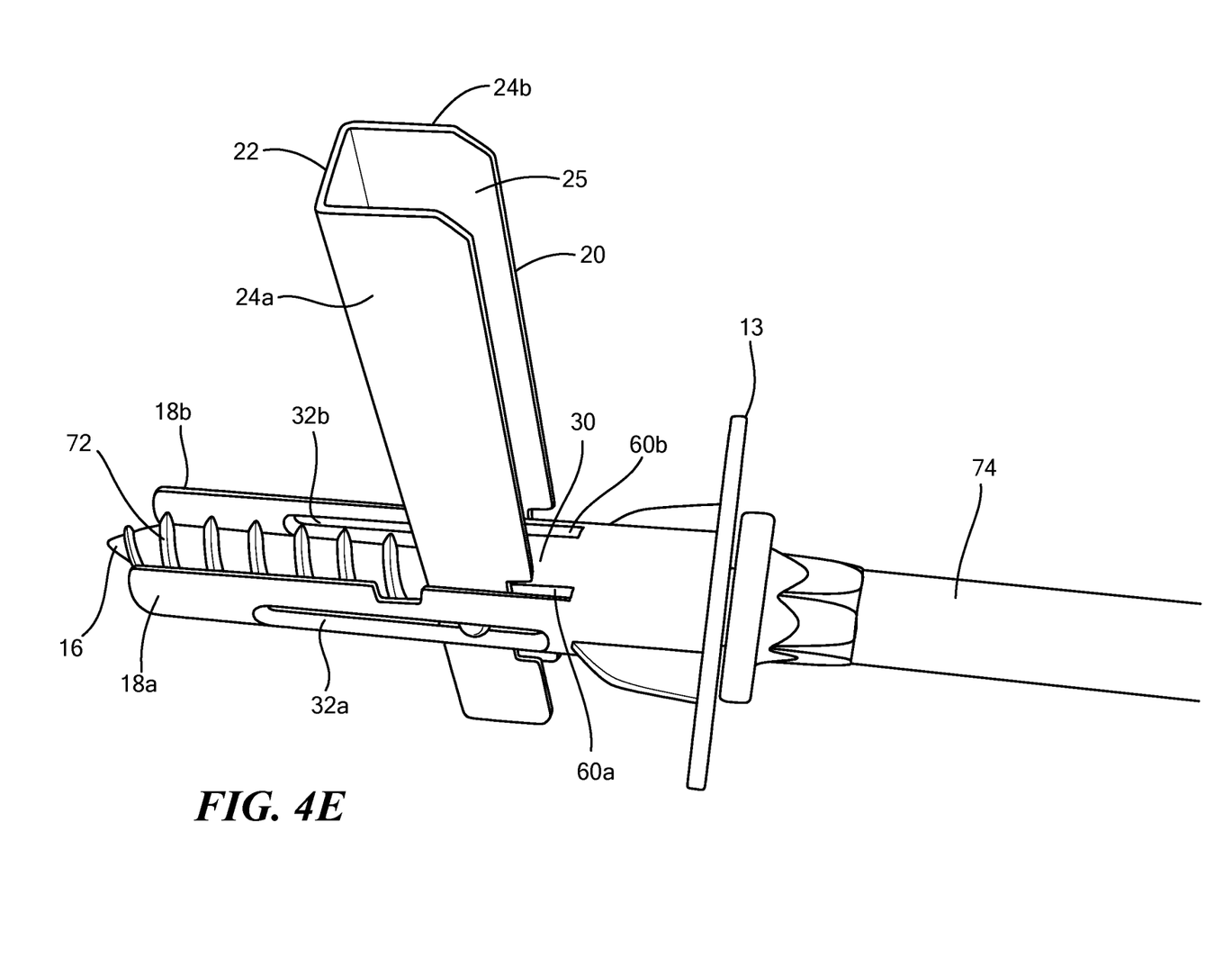
Figure 4F:
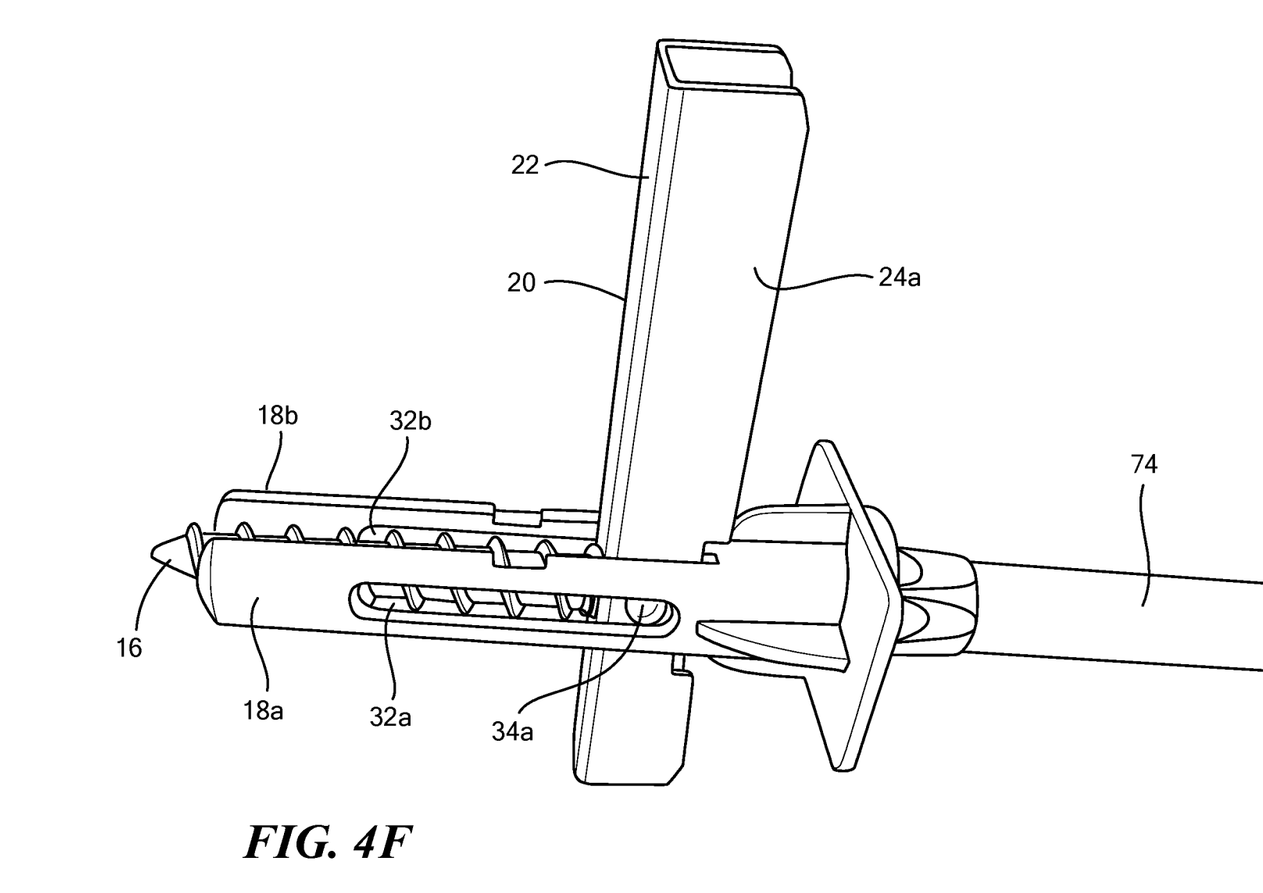

As shown in FIGS. 4A-4F, toggle member 20 in its first position resides in anchor body 11 channel 40 and is longitudinally aligned with the anchor body 11 (FIG. 4A) so the toggle member and the sidewalls 18a, 18b of the anchor body can be inserted through a hole in the wall until the rear 15 of collar plate 13 abuts the exterior of the wall. Toggle member 20 is slid to the distal most position between sidewalls 18a, 18b. As fastener 16 enters the toggle member and engages the sloping ramps 28a, 28b, toggle member 20 begins to pivot (FIG. 4B) with the longer extent 46a forward of aperture 26 pivoting upwards through the top opening 48 between sidewalls 18a, 18b of anchor body 11 and the shorter extent 46b rearward of aperture 26 pivoting downward through the bottom opening 50 between sidewalls 18a, 18b of anchor body 11. As the fastener is screwed further into the toggle member, the fastener enters toggle member aperture 26 (FIG. 4C) and then toggle member 20 is fully pivoted relative to the anchor body 11 as shown in FIG. 4D, preferably at an angle of approximately 90 degrees relative to the anchor body 11. Then, as the fastener 16 is further advanced, FIG. 4E, the toggle member slides to a proximal position between the anchor body 11 sidewalls relative to the anchor body 11.

For a thicker wall, toggle member 20 sidewalls 24a, 24b do not fully enter slots 60a, 60b between collar tab 30 and anchor body 11 sidewalls 18a, 18b and collar tab 30 does not fully extend into the toggle member 20 channel 25. For a thinner wall, toggle member 20 sidewalls 24a, 24b more fully enter slots 60a, 60b and collar tab 30 more fully engages within toggle member 20 channel 25. Thus, another function of collar tab 30, besides directing the fastener threaded portion to the toggle member 20 aperture, is to engage the toggle member in its pivoted position and when slid relative to the anchor body 11 fully rearward abutting the interior of the wall.

Figure 5:
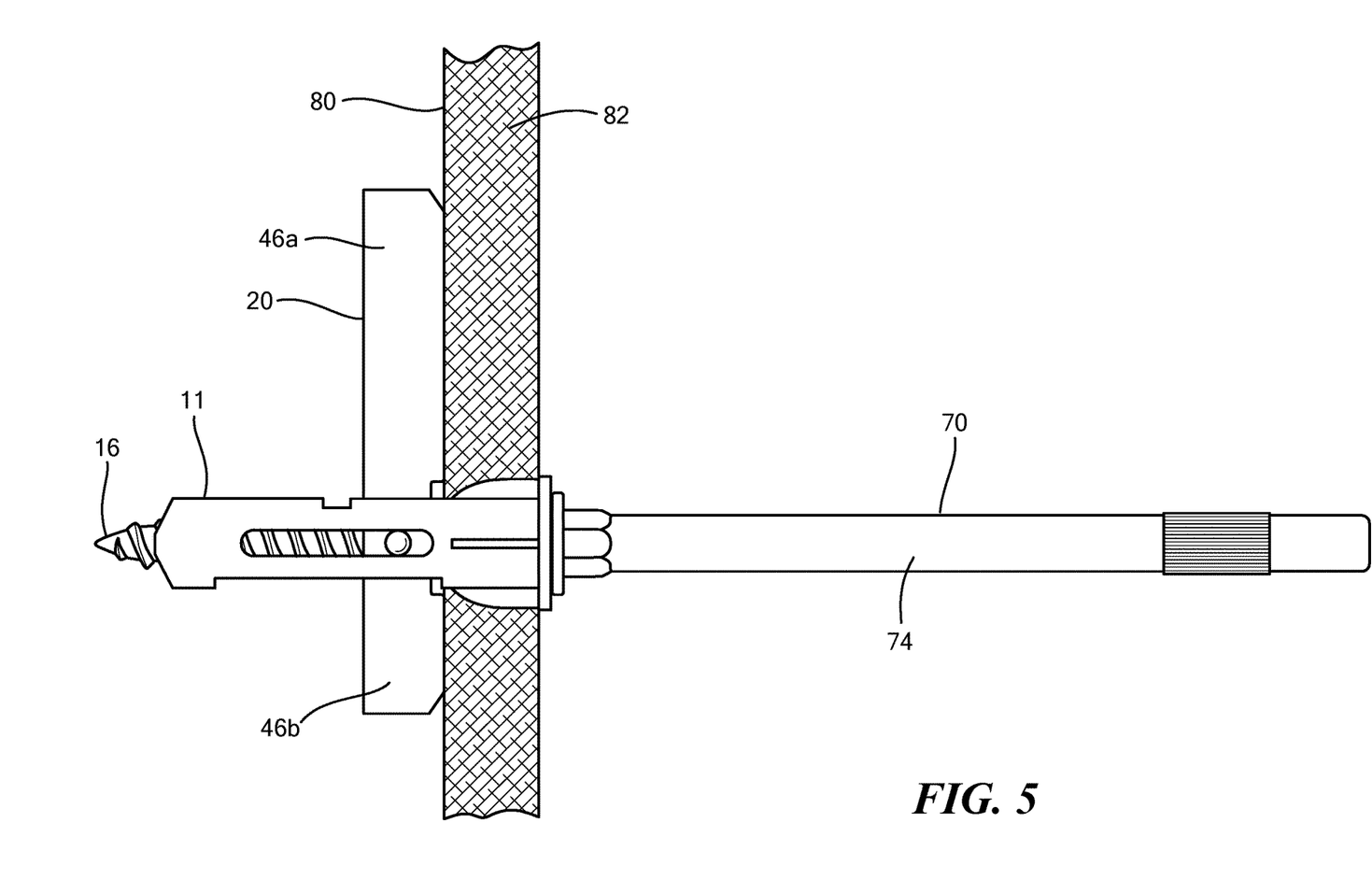
FIG. 5 is a schematic view showing the anchor assembly installed through a wall.

FIG. 5 shows the anchor assembly fully deployed with a fastener forming a bracketless shelf bolt 70 including threaded portion 72 (see FIG. 4E) and post end 74 extending from the threaded portion to be received in a hole drilled into the shelf. To better bear the weight of items placed on the shelf, it is preferred the longer extent 46a of the toggle member abuts the interior 80 of wall 82 in the position shown extending perpendicularly upwards from bolt 70. In other designs, however, the fastener need not be configured as a shelf post and the toggle member may include equal sized portions extending perpendicularly with respect to the anchor body 11.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. An anchor assembly comprising:
    an anchor body for insertion into a wall and including a channel portion with a pair of spaced sidewalls each with a passage therethrough; and
    a C-shaped toggle member received in the anchor body channel portion having an aperture therethrough and slidable and pivotable relative to the anchor body and configured to have a first position slid forward and aligned longitudinally with the anchor body, a second position slid forward and pivoted relative to the anchor body when the fastener engages the toggle member pivoting it relative to the anchor body, and a third position slid rearward and pivoted relative to the anchor body when the fastener enters the toggle member aperture and drives the toggle member rearward to engage the toggle member with the anchor body, the toggle member including a longitudinal channel and the anchor body including a tab extending into the toggle member longitudinal channel when the toggle member is in the third position and engaged with the anchor body.

2. The anchor assembly of claim 1 in which the toggle member includes a pair of spaced sidewalls each with a protrusion extending into an anchor body sidewall passage.

3. The anchor assembly of claim 1 in which the anchor body channel portion includes a top opening and a bottom opening each receiving an extent of the toggle member in its pivoted position.

4. The anchor assembly of claim 1 in which the toggle member longitudinal channel includes an interior sloping ramp behind the aperture engaged by the fastener to pivot the toggle member.

5. An anchor assembly comprising:
an anchor body including a collar with an aperture therethrough and spaced sidewalls extending rearwardly from the collar and defining a channel therebetween open at the top and bottom of the anchor body and a rearwardly extending collar tab between the sidewalls; and
a C-shaped toggle member including a bottom wall with an aperture therethrough and a pair of spaced sidewalls extending upwardly from the bottom wall and configured to have a first position aligned longitudinally with the anchor body and slidably disposed in said channel to a distal position between the sidewalls, a second position pivoted relative to the anchor body sidewalls and extending through the anchor body channel top and bottom openings when a fastener is driven through the collar aperture and the toggle member aperture, and a third position pivoted relative to the anchor body sidewalls and extending through the anchor body channel top and bottom openings and slid to a proximal position between the anchor body sidewalls engaging the collar tab when the fastener is further driven through the collar aperture and toggle member aperture, each toggle member sidewall including an interior sloping ramp behind the toggle member aperture engaged by the fastener to pivot the toggle member from the first position to the second position whereupon the fastener enters the toggle member aperture.

6. The anchor assembly of claim 5 in which there is a first slot between the collar tab and one anchor body sidewall and a second slot between the collar tab and the other anchor body sidewall.

7. The anchor assembly of claim 6 in which in the third position, the toggle member sidewalls reside partially in said first and second slots, respectively.

8. The anchor assembly of claim 5 in which the anchor body sidewalls each include a longitudinal passage and the toggle member sidewalls each include a protrusion extending outwardly therefrom into a said anchor body sidewall longitudinal passage.

9. The anchor assembly of claim 8 in which the toggle member has a longer extent forward of the toggle member aperture extending through the anchor body and a shorter extent rearward of the toggle member aperture extending through the anchor body when the toggle member is in the second and third positions.

10. The anchor assembly of claim 5 in which the anchor body collar includes a forward plate and a plurality of fins extending rearwardly therefrom.

11. The anchor assembly of claim 5 in which the fastener includes a threaded portion received through the collar aperture and toggle member aperture and a post extending from the threaded portion for bracketless shelving.

12. An anchor assembly comprising:
an anchor body including a collar with an aperture therethrough and spaced sidewalls extending rearwardly from the collar each including a longitudinal passage and defining a channel therebetween open at the top and bottom of the anchor body and a rearwardly extending collar tab between the sidewalls; and
a C-shaped toggle member including a bottom wall with an aperture therethrough and a pair of spaced sidewalls extending upwardly from the bottom wall, each sidewall including a protrusion extending outwardly therefrom into a said anchor body sidewall longitudinal passage, the toggle member configured to have a first position aligned longitudinally with the anchor body and slidably disposed in said channel to a distal position between the sidewalls, a second position pivoted relative to the anchor body sidewalls and extending through the anchor body channel top and bottom openings when a fastener is driven through the collar aperture and the toggle member aperture, and a third position pivoted relative to the anchor body sidewalls and extending through the anchor body channel top and bottom openings and slid to a proximal position between the anchor body sidewalls engaging the collar tab when the fastener is further driven through the collar aperture and toggle member aperture.

13. The anchor assembly of claim 12 in which each toggle member sidewall includes an interior sloping ramp behind the toggle member aperture engaged by the fastener to pivot the toggle member from the first position to the second position whereupon the fastener enters the toggle member aperture.

14. The anchor assembly of claim 12 in which there is a first slot between the collar tab and one anchor body sidewall and a second slot between the collar tab and the other anchor body sidewall.

15. The anchor assembly of claim 14 in which in the third position, the toggle member sidewalls reside partially in said first and second slots, respectively.

16. The anchor assembly of claim 12 in which the toggle member has a longer extent forward of the toggle member aperture extending through the anchor body and a shorter extent rearward of the toggle member aperture extending through the anchor body when the toggle member is in the second and third positions.

17. The anchor assembly of claim 12 in which the anchor body collar includes a forward plate and a plurality of fins extending rearwardly therefrom.

18. The anchor assembly of claim 12 in which the fastener includes a threaded portion received through the collar aperture and toggle member aperture and a post extending from the threaded portion for bracketless shelving.

* * * * *